United States Patent
Rao et al.

(10) Patent No.: US 7,606,904 B2
(45) Date of Patent: Oct. 20, 2009

(54) SENDING INTER-SERVER NOTIFICATIONS USING AN OUT-OF-BAND COMMUNICATIONS PROTOCOL

(75) Inventors: Deepak P. Rao, Bellevue, WA (US); Shaun D. Cox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 11/190,504

(22) Filed: Jul. 26, 2005

(65) Prior Publication Data

US 2006/0224744 A1  Oct. 5, 2006

Related U.S. Application Data

(60) Provisional application No. 60/666,785, filed on Mar. 30, 2005.

(51) Int. Cl.
  *G06F 15/173* (2006.01)
  *G06F 15/16* (2006.01)
  *G06F 15/177* (2006.01)

(52) U.S. Cl. .............. 709/226; 709/227; 709/242; 715/736

(58) Field of Classification Search .......... 709/226, 709/227
  See application file for complete search history.

(56) References Cited

U.S. PATENT DOCUMENTS

| | | | |
|---|---|---|---|
| 2002/0116484 A1* | 8/2002 | Podracky | 709/223 |
| 2002/0184373 A1* | 12/2002 | Maes | 709/228 |
| 2003/0135823 A1* | 7/2003 | Marejka et al. | 715/511 |
| 2003/0148779 A1* | 8/2003 | Aravamudan et al. | 455/519 |
| 2003/0187650 A1* | 10/2003 | Moore et al. | 704/260 |
| 2004/0015548 A1* | 1/2004 | Lee | 709/204 |
| 2004/0062383 A1* | 4/2004 | Sylvain | 379/265.06 |
| 2004/0064693 A1* | 4/2004 | Pabla et al. | 713/168 |
| 2004/0205175 A1* | 10/2004 | Kammerer | 709/223 |
| 2005/0034079 A1* | 2/2005 | Gunasekar et al. | 715/753 |
| 2006/0119882 A1* | 6/2006 | Harris et al. | 358/1.15 |

OTHER PUBLICATIONS

Rosenberg, J. "A Presence Event Package for the Session Initiation Protocol (SIP)," Network Working Group, Aug. 2004 (27 pages).
Rosenberg, J., et al., "SIP: Session Initiation Protocol," Network Working Group, Jun. 2002 (269 pages).
Day, M., et al., "A Model for Presence and Instant Messaging," Network Working Group, Feb. 2000 (17 pages).

* cited by examiner

*Primary Examiner*—Ario Etienne
*Assistant Examiner*—Blake Rubin
(74) *Attorney, Agent, or Firm*—Perkins Coie LLP

(57) ABSTRACT

A method and system for sending notifications from servers of a server pool to clients is provided. The notification system determines when an in-band notification is to be sent to clients. The notification system identifies a distinguished server for each client that is to send the in-band notification to that client. The notification system then sends an out-of-band notification to the distinguished server of each client indicating that an in-band notification is to be sent to the client. When the distinguished server receives the out-of-band notification, the distinguished server then sends an in-band notification to the client.

15 Claims, 7 Drawing Sheets

SENDING INTER-SERVER NOTIFICATIONS USING AN OUT-OF-BAND COMMUNICATIONS PROTOCOL

CROSS-REFERENCE TO RELATED APPLICATION

This application claims the benefit of U.S. Provisional Application No. 60/666,785 filed Mar. 30, 2005 entitled "Batched RPC Notifications," which application is hereby incorporated by reference in its entirety.

BACKGROUND

Users of computing devices (e.g., laptops, cellular phones, and personal digital assistants) often need to communicate in real time. A common form of real-time communications is provided by instant messaging services. An instant messaging service allows participants at endpoints to send messages and have them received within a second or two by the other participants in a conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

Presence services provide this availability information. The availability status of an entity such as a computer system (i.e., endpoint) or a user associated with that computer system is referred to as "presence information." Presence information identifies the current "presence state" of the user. Users make their presence information available to a presence service so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call. A specification relating to presence information in instant messaging systems, "RFC 2778." A draft of a proposed specification relating to presence information using the Session Initiation Protocol ("SIP") is available at "internet-drafts/draft-ietf-simple-presence-10.txt"of the Internet Engineering Taskforce website.

To support real-time communications, communications applications typically need to establish and manage connections (also referred to as sessions or dialogs) between computing devices. A session is a set of interactions between computing devices that occurs over a period of time. As an example, real-time communications applications such as MESSENGER or VoIP establish sessions between communicating devices on behalf of users. These applications may use various mechanisms to establish sessions, such as the Session Initiation Protocol ("SIP"). SIP is an application-level control protocol that computing devices can use to discover one another and to establish, modify, and terminate sessions between computing devices. SIP is a proposed Internet standard. The SIP specification, "RFC 3261," is available at "rfc/rfc3261.txt" of the Internet Engineering Taskforce website.

A SIP network comprises entities that can participate in a dialog as a client, server, or both. SIP supports four types of entities: user agent, proxy server, redirect server, and registrar. User agents initiate and terminate dialogs by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is a device that acts as a server to clients and a client to servers. In so doing, proxy servers intercept, interpret, or forward messages between UACs and UASs. A redirect server is a device that accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a Request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

User agents can communicate by sending SIP messages during a SIP dialog. A SIP dialog is a peer-to-peer relationship between two user agents that persists for some time. A dialog may be established when a UAC sends an INVITE request to a UAS and the UAS replies with a 200 OK response.

SIP is often used as the protocol for communicating with a presence server. Each publisher and subscriber uses SIP to establish a dialog with the presence server and to subscribe to and publish presence information. When the presence information of a publisher is updated, the presence server sends a SIP NOTIFY message to each subscriber. The message identifies the publisher and includes the updated presence information of the publisher.

Because of the popularity of instant messaging and other real-time services, a provider of presence services often needs to provide a pool of servers to support the presence service. For example, a large organization may need to provide presence information for tens of thousands of users. Because of the real-time requirements and the high volume of communications that are sent between the clients and servers of a presence service, a single server is typically not sufficient. Although the presence service may be provided by a pool of presence servers, the pool appears as a single presence server to the client. For example, when a client logs on to or establishes a connection with a presence service, the logon request may be routed through a load balancer that selects an available server of the server pool and directs the logon request to the selected server. When a client publishes presence information of its user, the client's server provides the presence information to the client's subscribers. The information of the presence service may be stored and accessed through a back-end database server, which may be a SQL server. The back-end database server may store the current presence information of each publisher, and for each publisher, store the identity of each subscriber to that publisher's presence information in database tables. When a front-end presence server receives a request, it accesses the back-end database server to respond to the request.

Some implementations of SIP require that all messages of a session travel through the same sequence of devices (e.g., proxy servers). Thus, when the load balancer of a server pool assigns an available server through which a client is to log on, all subsequent messages of the session from the server pool to the client need to include that assigned server. The presence server tracks such "home" server for each client by storing a mapping of client to home server in the back-end database.

When the presence servers receives a request from a publisher to update the publisher's presence information, the home server for the publisher is responsible for updating the publisher's presence information in the back-end database and for initiating the sending of notifications to the subscribers of the publisher's presence information. The home server of the publisher typically identifies the subscribers and uses the mapping of client to home server to identify the home server of each client. The home server of the publisher then sends, for each subscriber, a SIP NOTIFY message to the subscriber's home server. Upon receiving the SIP NOTIFY message, the subscriber's home server then sends a SIP NOTIFY message to the subscriber's computing device. This allows a SIP NOTIFY message that is received at a subscriber to have originated from the home server of the subscriber as required by some implementations of SIP.

Unfortunately, the establishing of SIP dialogs and sending of SIP messages between servers can have a high overhead. This high overhead adversely affects both the response time of a pool of servers and the number of publishers and subscribers that a pool of servers can support.

SUMMARY

A method and system for sending notifications from servers of a server pool to clients is provided. The notification system determines when an in-band notification is to be sent to clients. The notification system identifies a distinguished server for each client that is to send the in-band notification to that client. The notification system then sends an out-of-band notification to the distinguished server of each client indicating that an in-band notification is to be sent to the client. When the distinguished server receives the out-of-band notification, the distinguished server then sends an in-band notification to the client. The servers of the server pool thus send inter-server notifications using an out-of-band protocol that is more efficient than the in-band protocol used to communicate with clients.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
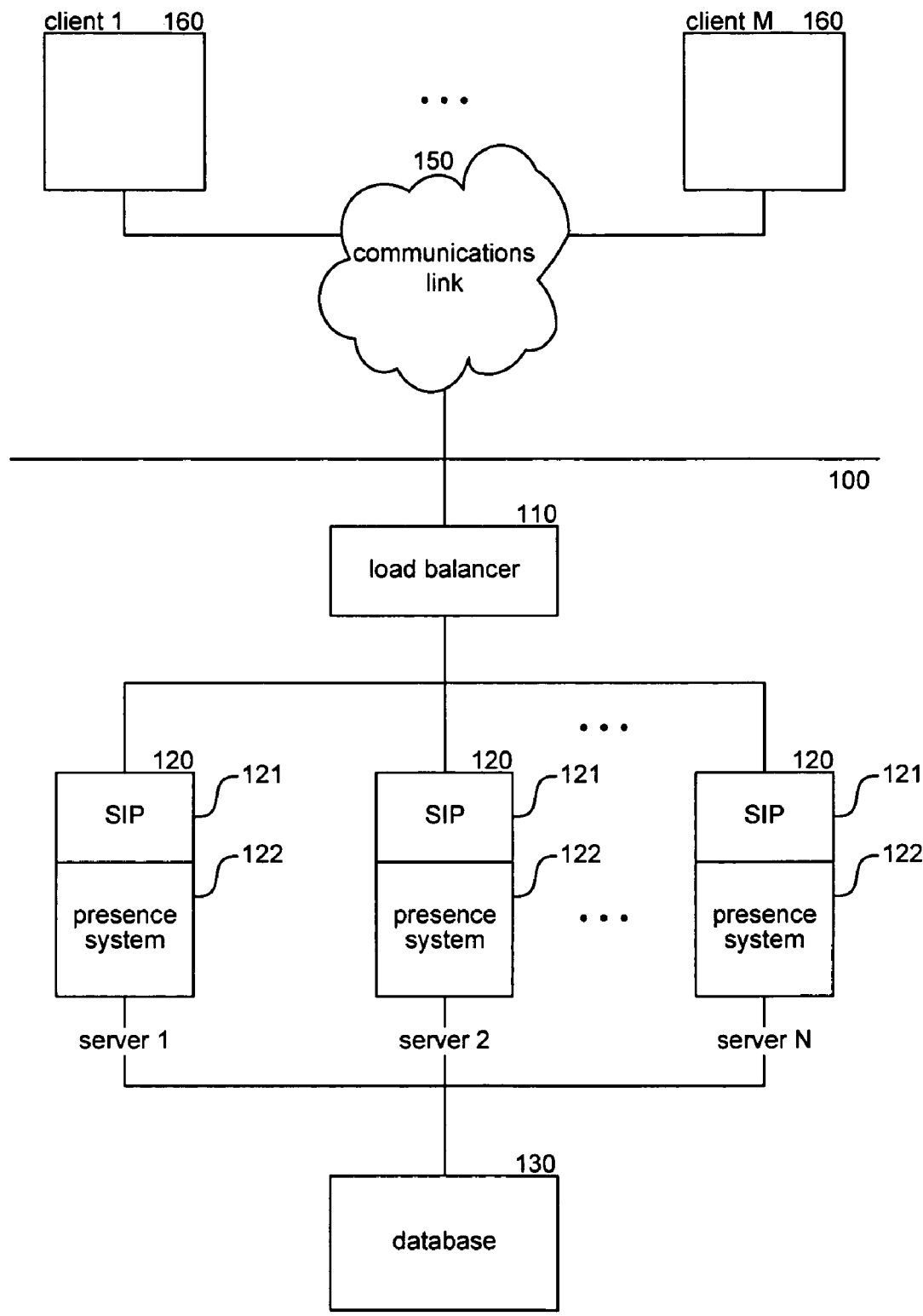
FIG. 1 is a block diagram that illustrates a server pool that implements the notification system as part of a presence system in one embodiment.

A method and system for sending notifications from servers of a server pool to clients is provided. In one embodiment, the notification system determines when an in-band notification is to be sent to clients. An in-band notification uses an in-band protocol that may be SIP. For example, when a presence service receives an update to the presence information of a publisher, a SIP notification using an in-band protocol—SIP—needs to be sent to the client (i.e., computing device) of each subscriber to the publisher's presence information. The notification system also identifies a distinguished server for each client that is to send the in-band notification to that client. For example, the distinguished server of a subscriber to presence information may be the home server through which the subscriber logged on to the presence service. The notification system then sends an out-of-band notification to the distinguished server of each client indicating that an in-band notification is to be sent to the client. For example, the out-of-band notification may be sent using an out-of-band protocol such as a remote procedure call ("RPC") protocol. An RPC protocol typically has less communications overhead than SIP. When the distinguished server receives the out-of-band notification, the distinguished server then sends an in-band notification to the client. For example, when a presence server receives an RPC call that indicates a subscriber is to be notified of an update to a publisher's presence information, the presence server creates and sends a SIP notification to that subscriber. In this way, the servers of the server pool send inter-server notifications using an out-of-band protocol that is more efficient than the in-band protocol used to communicate with clients.

In one embodiment, the notification system may batch the out-of-band notifications that are sent between servers of a server pool. For example, the notification system may identify all the subscribers of a publisher's presence information that have the same home server. The notification system then sends a batched notification to each home server identifying the subscribers who are to be notified of the update to the publisher's presence information and who have that server as their home server. That home server can then create and send an in-band notification to each client. For example, the home server may send a SIP NOTIFY message to each subscriber identified in the batched notification sent using an RPC protocol. The batching of out-of-band notifications further reduces the inter-server communications overhead of a server pool. In addition, in one embodiment, a notification system that uses in-band notifications between servers can batch those notifications to help reduce the communications overhead. For example, a SIP extension may be defined that indicates that a SIP NOTIFY message indicates that it is a batched notification that identifies multiple subscribers that need to be notified. In this way, the inter-server communications overhead can be reduced even if only in-band notifications are used between servers. This batching of in-band notifications may also be extended to inter-pool notifications that may be sent in between the server pools of federated presence services.

FIG. 1 is a block diagram that illustrates a server pool that implements the notification system as part of a presence system in one embodiment. The server pool 100 includes a load balancer 110 connected to presence servers 120. Each presence server is connected to a database 130. Each presence server includes a SIP component 121 and a presence system 122. The server pool is connected to clients 160 via a communications link 150. When the load balancer receives a logon request from a client, the load balancer identifies a presence server to assign as a home server for that client. The load balancer may access its own database (not shown) to identify the number of subscribers assigned to each server and may assign to that client the presence server with the smallest number of clients assigned to it as their home server. The load balancer then updates its database to reflect the assignment. The assigned home server then updates the client/home server table of the database to reflect the assignment. When a publisher sends a request to update their presence information, the load balancer receives the SIP request from the publisher and routes the update request to the home server of the publisher. The home server of the publisher updates the presence information of the publisher in the database and identifies the subscribers to the presence information of the publisher. The presence system of the home server also identifies the home servers of the subscribers. The presence system notifies each home server of each subscriber that the subscriber is to be notified of the update to the publisher's presence information. The presence system may batch the notifications directed to a home server and send the batched notification via SIP. The presence system may alternatively send the notifications to the home servers using a RPC protocol that may or may not batch the notifications.

Figure 2:
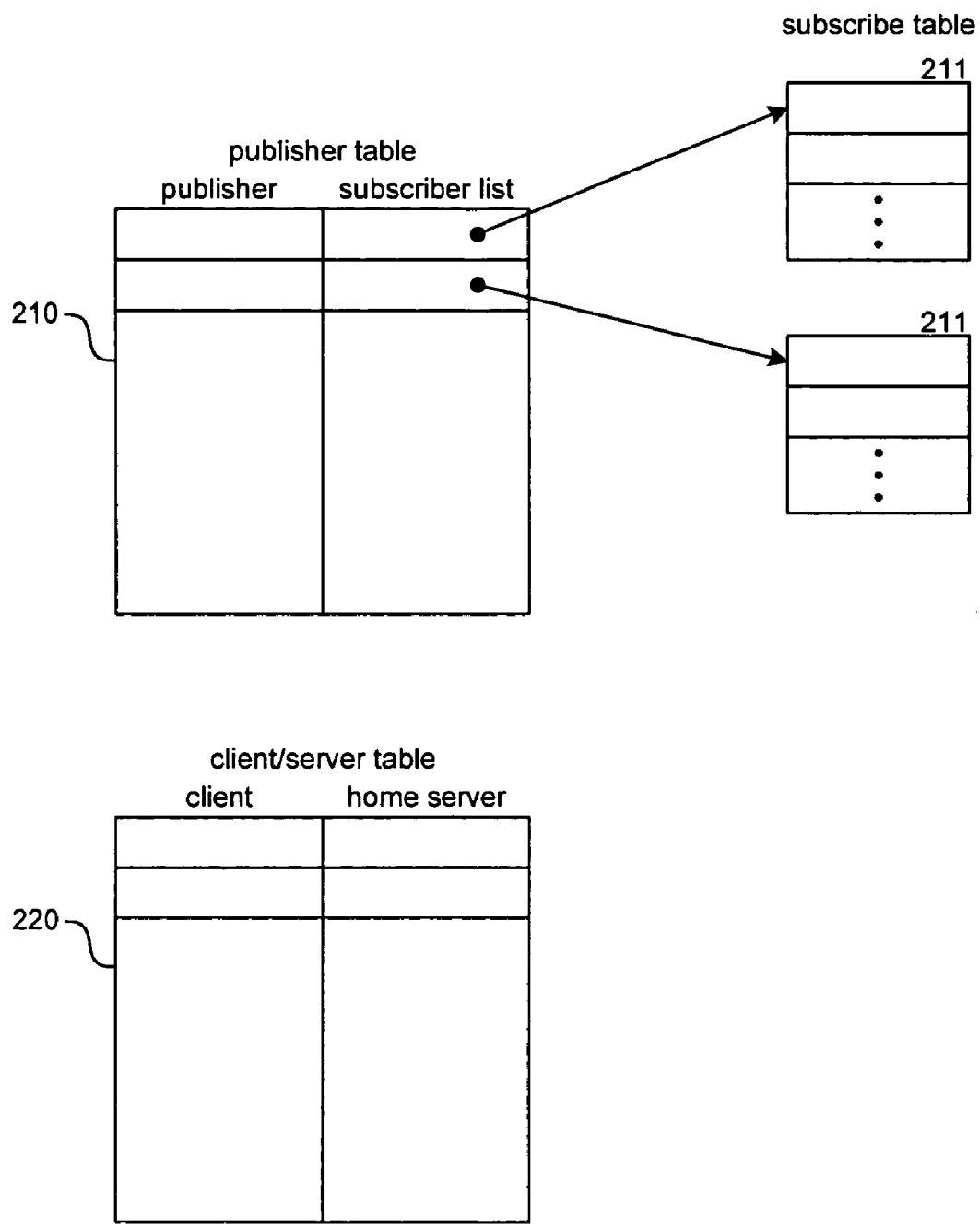
FIG. 2 is a block diagram that illustrates data structures of the database of the presence system in one embodiment.

FIG. 2 is a block diagram that illustrates data structures of the database of the presence system in one embodiment. The database may include a publisher table 210 and a client/home server table 220. The publisher table maps each publisher to the subscribers to the presence information of the publisher. The publisher table contains an entry for each publisher that points to a subscriber table 211 for that publisher. The client/home server table contains an entry for each logged on client that identifies the home server of that client.

Figure 3:
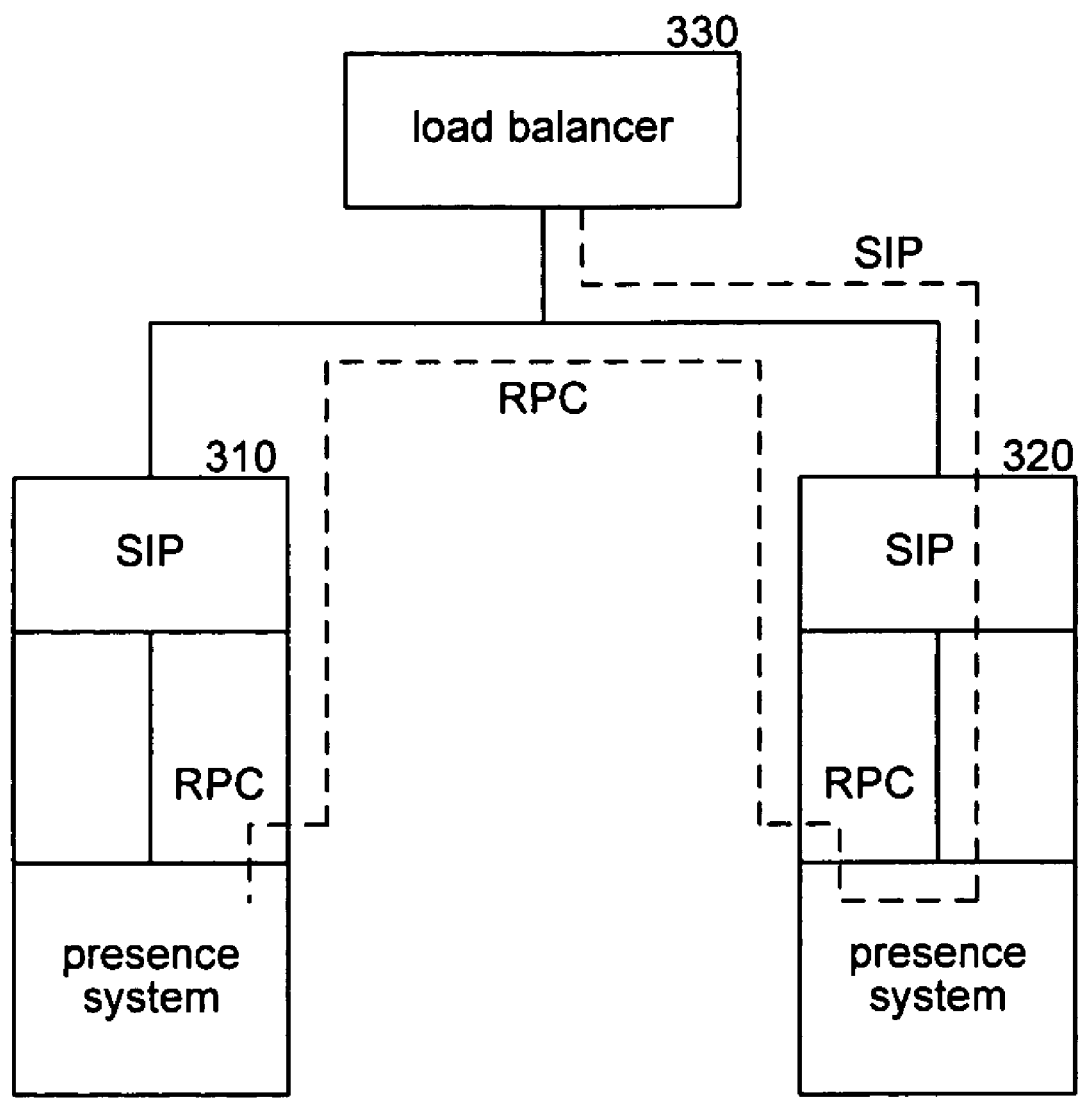
FIG. 3 is a block diagram that illustrates the sending of presence information from server to server of a server pool using an RPC protocol in one embodiment.

FIG. 3 is a block diagram that illustrates the sending of presence information from server to server of a server pool using an RPC protocol in one embodiment. The server pool includes load balancer 330 and servers 310-320. This figure illustrates the sending of an RPC notification between servers. The presence system of server 310 initiates the notification and invokes an RPC component to place a remote procedure call to server 320. The parameters of the remote procedure call identify the subscribers to be notified and include the updated presence information of the publisher. Server 320 receives the RPC call. The RPC call, illustrated by the dashed line, may batch notifications or may be placed for each subscriber of the publisher's presence information. The presence system of the server that receives the RPC call then sends a SIP notification to each subscriber identified in the RPC call.

Figure 4:
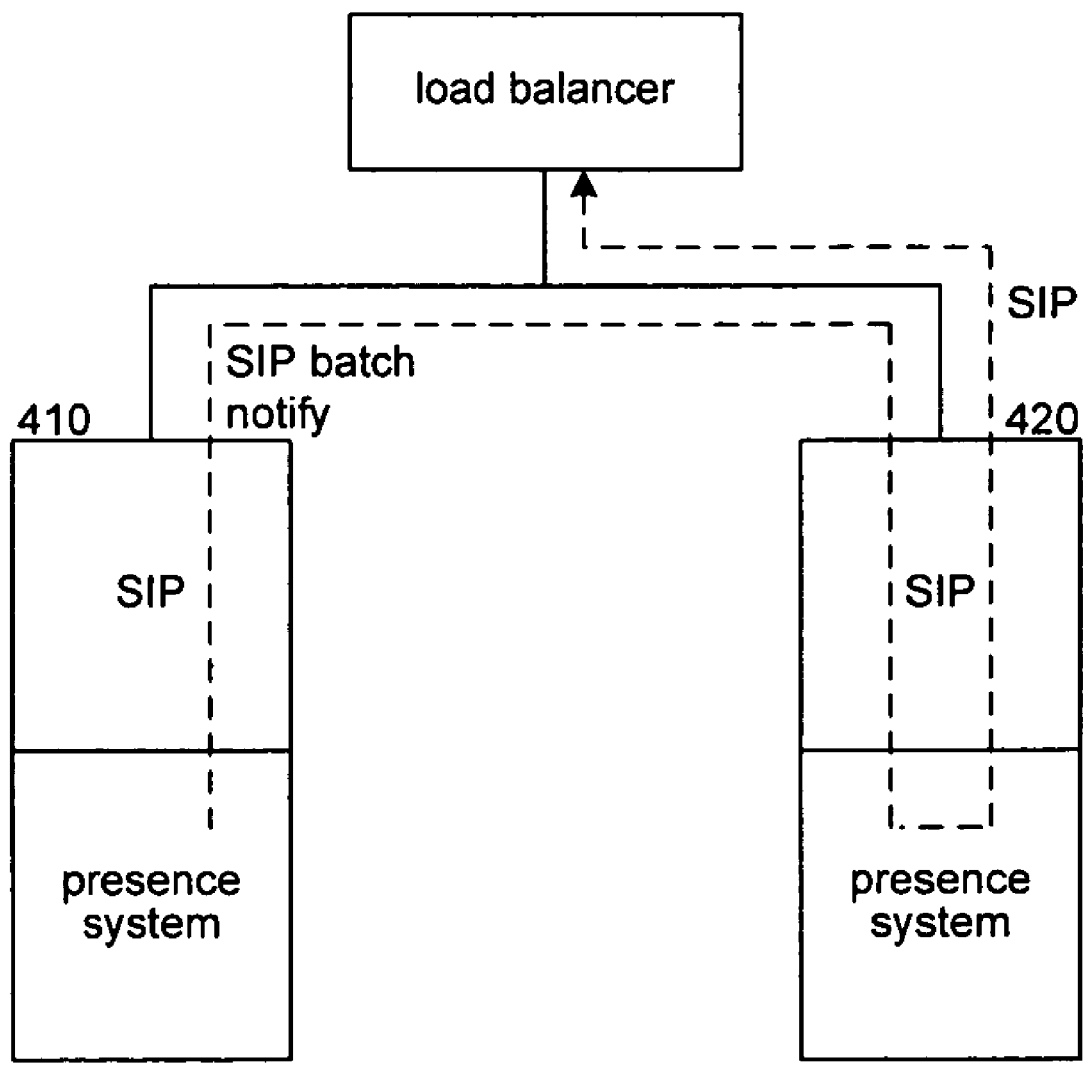
FIG. 4 is a block diagram that illustrates the sending of a batched notification from server to server using SIP in one embodiment.

FIG. 4 is a block diagram that illustrates the sending of a batched notification from server to server using SIP in one embodiment. Server 410 creates and sends a batched notification using SIP to server 420. The batched notification identifies the subscribers logged on through that server who are to be notified of the update to the presence information of the publisher. Upon receiving the batched notification, the presence system at server 420 creates and sends a SIP NOTIFY message for each subscriber identified in the batched notification.

Figure 5:
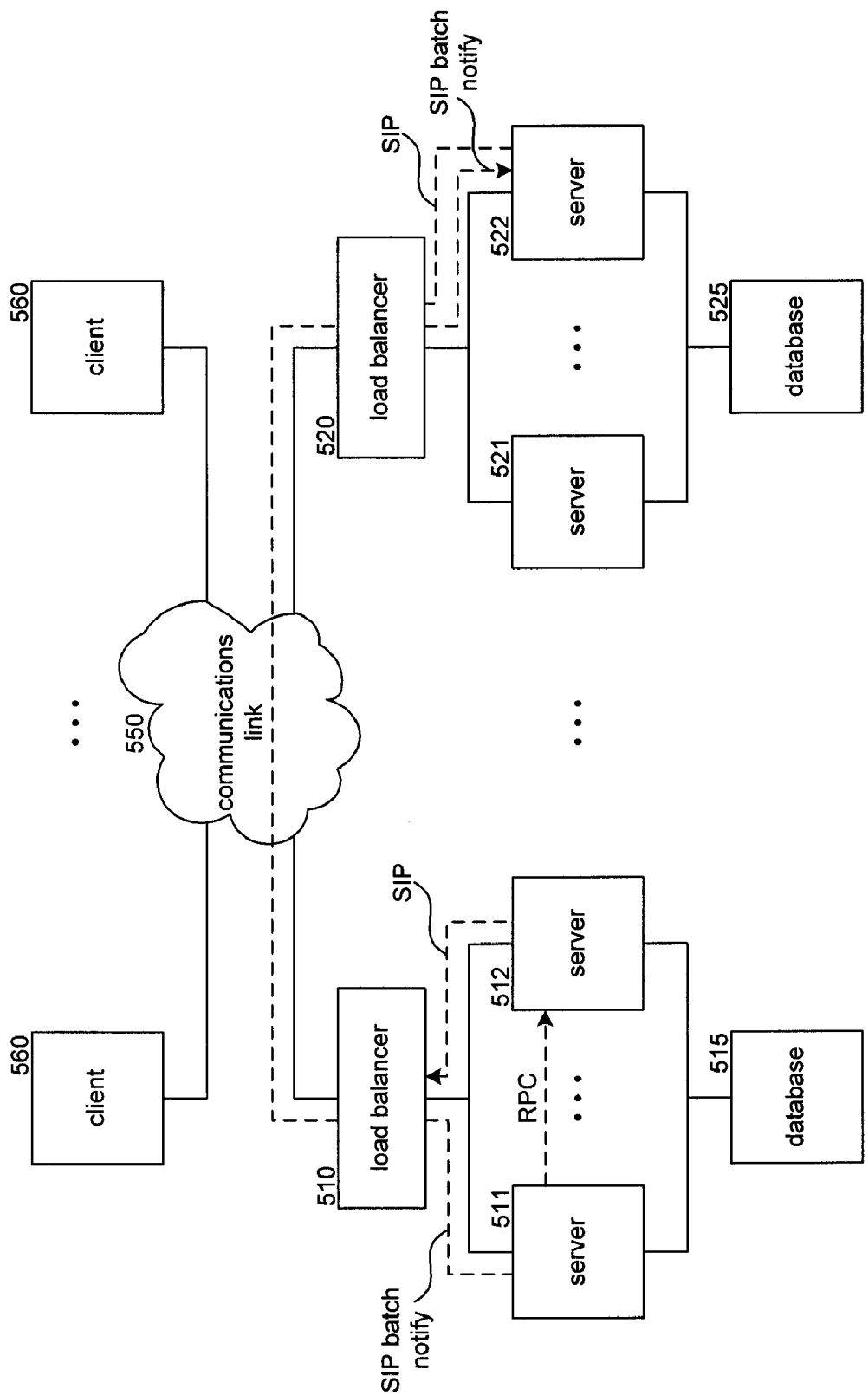
FIG. 5 is a block diagram that illustrates the sending of batched notifications between server pools in one embodiment.

FIG. 5 is a block diagram that illustrates the sending of batched notifications between server pools in one embodiment. Server pool 510 includes a load balancer, servers 511-512, and a database 515. Server pool 520 includes a load balancer, servers 521-522, and a database 525. In this example, server 511 determines that various clients need to be notified. Some of the clients have server 512 as their home server and other clients have server 522 as their home server. The notification system of server 511 sends an RPC notification to server 512 and a batched SIP NOTIFY message to server 522. When server 512 receives the RPC notification, it sends a SIP NOTIFY message to each client identified in the message. When server 522 receives the batched SIP NOTIFY message, it sends a SIP NOTIFY message to each client identified in the received SIP NOTIFY message. Thus, the notification system uses batched out-of-band communications for intra-pool communications and batched in-band communications for inter-pool communications.

The computing device on which the notification system is implemented may include a central processing unit, memory, input devices (e.g., keyboard and pointing devices), output devices (e.g., display devices), and storage devices (e.g., disk drives). The memory and storage devices are computer-readable storage media that may contain instructions that implement the system. In addition, the data structures and message structures may be transmitted via a data transmission medium, such as a signal on a communication link. Various communication links may be used, such as the Internet, a local area network, a wide area network, a point-to-point dial-up connection, a cell phone network, and so on.

Embodiments of the notification system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
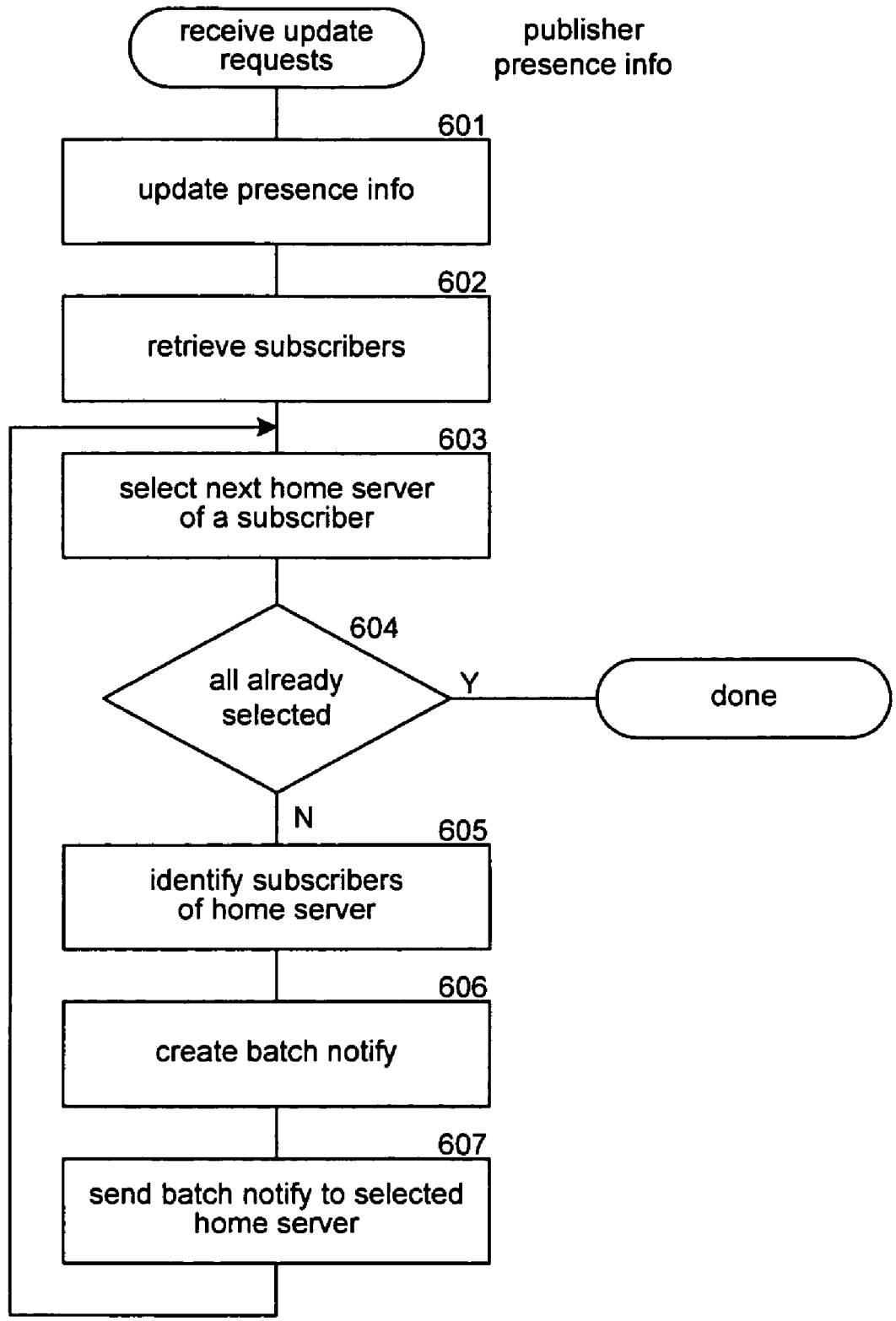
FIG. 6 is a flow diagram that illustrates the processing of a component of the presence system that receives a request to update presence information of a publisher in one embodiment.

FIG. 6 is a flow diagram that illustrates the processing of a component of the presence system that receives a request to update presence information of a publisher in one embodiment. The component is passed an indication of the publisher and the updated presence information. In block 601, the component updates the presence information of the publisher that is stored in the database. In block 602, the component retrieves the identity of the subscribers to the publisher's presence information along with the identity of their home servers from the database. In blocks 603-607, the component loops selecting each home server of a subscriber and notifying the home servers of the subscribers that are to be notified of the updated presence information. In block 603, the components selects the next home server of a subscriber. In decision block 604, if all the home servers have already been selected, then the component completes, else the component continues in block 605. In block 605, the component identifies all the subscribers who have the selected home server as their home server. In block 606, the component creates a batched RPC notification. In block 607, the component sends the batched notification by placing an RPC call to the selected home server and then loops to block 603 to select the next home server.

Figure 7:
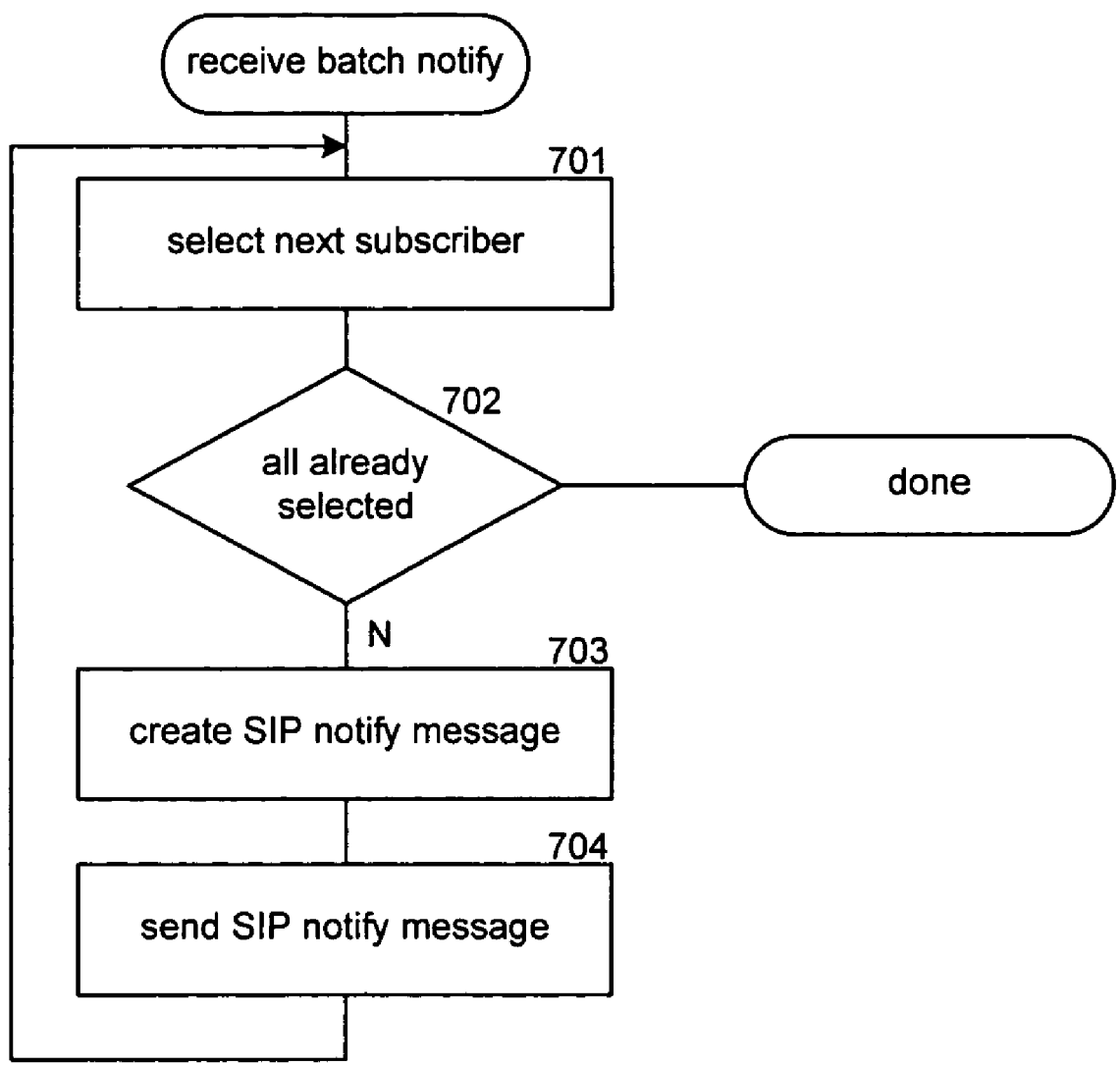
FIG. 7 is a flow diagram that illustrates the processing of a component of the presence system that receives a batched notification in one embodiment.

FIG. 7 is a flow diagram that illustrates the processing of a component of the presence system that receives a batched notification in one embodiment. The batched notification may include the identity of the subscribers to be notified along with the updated presence information of the publisher. Alternatively, the batched notification may identify only the publisher. In that case, the home server that receives the batched notification would need to access the database to retrieve the identity of the subscribers and the updated presence information of the publisher. Such an alternative, however, would require that each home server access the database. In blocks 701-704, the component loops selecting each subscriber and sending a SIP NOTIFY message to the selected subscriber. In block 701, the component selects the next subscriber indicated in the notification. In decision block 702, if all the subscribers have already been selected, then the component completes, else the component continues at block 703. In block 703, the component creates a SIP NOTIFY message for the selected subscriber. In block 704, the component sends the SIP NOTIFY message and then loops to block 701 to select the next subscriber.

Although the subject matter has been described in language specific to structural features and/or methodological acts, it is to be understood that the subject matter defined in the appended claims is not necessarily limited to the specific features or acts described above. In one embodiment, the notification system may provide data protection (e.g., encryption) for the out-of-band notification so that it will have at least as much data protection as an in-band notification. The notification system may also compress the notifications whether they are sent using in-band or out-of-band protocols. Rather, the specific features and acts described above are disclosed as example forms of implementing the claims. Accordingly, the invention is not limited except as by the appended claims.

We claim:

1. A method in a server pool of servers for sending notifications of presence information to subscribers of presence information of publishers, each server of the server pool for accessing presence-related information via a back-end database server, the back-end database server storing presence information of publishers and subscription information of subscribers, the publishers and subscribers being clients of presence information, the method comprising:

for each client,
  receiving at a load balancer for the server pool a logon request from the client; and
  upon receiving the logon request from the client,
    selecting at the load balancer a server of the server pool to be assigned as being a distinguished server for the client based on number of clients assigned to each server; and
    storing by the load balancer at the back-end database server an indication that the selected server has been assigned to be the distinguished server of the client;

receiving at the load balancer an update to presence information of a publisher;

after receiving the update,
  determining at the load balancer the distinguished server of the publisher; and
  sending from the load balancer to the distinguished server of the publisher an indication of the updated presence information of the publisher;

storing at the back-end database server by the distinguished server of the publisher updated presence information of the publisher;

determining by the distinguished server of the publisher that an in-band notification is to be sent to subscribers to the presence information of the publisher by retrieving from the back-end database server an indication of subscribers to the presence information of the publisher;

identifying by the distinguished server of the publisher a distinguished server for each subscriber to the presence information of the publisher by retrieving from the back-end database server an indication of the distinguished server of each subscriber;

sending from the distinguished server of the publisher an out-of-band notification to each distinguished server of each subscriber, the out-of-band notification indicating that the distinguished server is to send an in-band notification to the subscriber whose distinguished server is that distinguished server, the in-band notification indicating the updated presence information of the publisher so that the distinguished server of a subscriber can send to the subscriber a notification of the updated presence information; and under control of each distinguished server of each subscriber,
retrieving from the back-end database server, undated presence information of the publisher; and
sending the retrieved undated presence information to the subscriber.

2. The method of claim 1 wherein the in-band notification uses a session initiation protocol and the out-of-band notification uses a remote procedure call protocol.

3. The method of claim 2 wherein both the in-band and out-of-band notifications are encrypted.

4. The method of claim 1 wherein an out-of-band notification identifies multiple clients that are to receive an out-of-band notification and that have the same distinguished server.

5. The method of claim 1 wherein a distinguished server is a server from which a client is to receive all notifications from the server pool.

6. The method of claim 1 wherein the in-band notification uses a session initiation protocol and the out-of-band notification uses a remote procedure call protocol, wherein the notification indicates that presence information of a publisher has been updated, wherein the out-of-band notification identifies multiple clients that are to receive the notification and that have the same distinguished server, and wherein the distinguished server is a server from which a client is to receive all notifications from the server pool.

7. The method of claim 6 wherein a load balancer assigns distinguished servers to clients.

8. A server pool of servers for sending notifications of presence information to subscribers of presence information of publishers, each server of the server pool for accessing presence-related information via a back-end database server, the back-end database server storing presence information of publishers and subscription information of subscribers, the publishers and subscribers being clients of presence information, comprising:
a load balancer that,
for each client,
receives for the server pool a logon request from the client; and
upon receiving the logon request from the client,
selects a server of the server pool to be assigned as being a distinguished server for the client based on number of clients assigned to each server; and
stores at the back-end database server an indication that the selected server has been assigned to be the distinguished server of the client;
receives an update to presence information of a publisher; and
after receiving the update,
determines the distinguished server of the publisher; and
sends to the distinguished server of the publisher an indication of the updated presence information of the publisher; and
a plurality of servers that
when a server is a distinguished server of a publisher,
receives from the load balancer an indication of updated presence information of the publisher;
stores at the back-end database server updated presence information of the publisher;
determines that an in-band notification is to be sent to subscribers to the presence information of the publisher by retrieving from the back-end database server an indication of subscribers to the presence information of the publisher;
identifies a distinguished server for each subscriber to the presence information of the publisher by retrieving from the back-end database server an indication of the distinguished server of each subscriber; and
sends an out-of-band notification to each distinguished server of each subscriber, the out-of-band notification indicating that the distinguished server is to send an in-band notification to the subscriber whose distinguished server is that distinguished server, the in-band notification indicating the updated presence information of the publisher so that the distinguished server of a subscriber can send to the subscriber a notification of the updated presence information; and
when the server is the distinguished server a subscriber of a publisher,
receives from the distinguished server of the publisher an out-of-band notification;
retrieves from the back-end database server, updated presence information of the publisher; and
sends the retrieved updated presence information to the subscriber.

9. The server pool of claim 8 wherein the in-band notification uses a session initiation protocol and the out-of-band notification uses a remote procedure call protocol.

10. The server pool of claim 8 wherein both the in-band and out-of-band notifications are encrypted.

11. The server pool of claim 8 wherein an out-of-band notification identifies multiple clients that are to receive an out-of-band notification and that have the same distinguished server.

12. One or more computer-readable storage media storing computer-executable instructions for controlling a server pool of servers to send notifications of presence information to subscribers of presence information of publishers, each server of the server pool for accessing presence-related information via a back-end database server, the back-end database server storing presence information of publishers and subscription information of subscribers, the publishers and subscribers being clients of presence information, by a method comprising:
for each client,
receiving at a load balancer for the server pool a logon request from the client; and
upon receiving the logon request from the client,
selecting at the load balancer a server of the server pool to be assigned as being a distinguished server for the client based on number of clients assigned to each server; and
storing by the load balancer at the back-end database server an indication that the selected server has been assigned to be the distinguished server of the client;
receiving at the load balancer an update to presence information of a publisher; after receiving the update,
determining at the load balancer the distinguished server of the publisher; and
sending from the load balancer to the distinguished server of the publisher an indication of the updated presence information of the publisher;
storing at the back-end database server by the distinguished server of the publisher updated presence information of the publisher;
determining by the distinguished server of the publisher that an in-band notification is to be sent to subscribers to the presence information of the publisher by retrieving from the back-end database server an indication of subscribers to the presence information of the publisher;

identifying by the distinguished server of the publisher a distinguished server for each subscriber to the presence information of the publisher by retrieving from the back-end database server an indication of the distinguished server of each subscriber;

sending from the distinguished server of the publisher an out-of-band notification to each distinguished server of each subscriber, the out-of-band notification indicating that the distinguished server is to send an in-band notification to the subscriber whose distinguished server is that distinguished server, the in-band notification indicating the updated presence information of the publisher so that the distinguished server of a subscriber can send to the subscriber a notification of the updated presence information; and under control of each distinguished server of each subscriber, retrieving from the back-end database server, updated presence information of the publisher; and sending the retrieved updated presence information to the subscriber.

13. The one or more computer-readable storage media of claim 12 wherein the in-band notification uses a session initiation protocol and the out-of-band notification uses a remote procedure call protocol.

14. The one or more computer-readable storage media of claim 12 wherein both the in-band and out-of-band notifications are encrypted.

15. The one or more computer-readable storage media of claim 12 wherein an out-of-band notification identifies multiple clients that are to receive an out-of-band notification and that have the same distinguished server.

* * * * *

UNITED STATES PATENT AND TRADEMARK OFFICE
CERTIFICATE OF CORRECTION

| | |
|---|---|
| PATENT NO. | : 7,606,904 B2 |
| APPLICATION NO. | : 11/190504 |
| DATED | : October 20, 2009 |
| INVENTOR(S) | : Rao et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,904 B2 | Page 1 of 1 |
| APPLICATION NO. | : 11/190504 | |
| DATED | : October 20, 2009 | |
| INVENTOR(S) | : Deepak P. Rao et al. | |

It is certified that error appears in the above-identified patent and that said Letters Patent is hereby corrected as shown below:

In column 9, line 3, in Claim 1, delete "undated" and insert -- updated --, therefor.

In column 9, line 5, in Claim 1, delete "undated" and insert -- updated --, therefor.

Signed and Sealed this
Eighth Day of February, 2011

David J. Kappos
*Director of the United States Patent and Trademark Office*